March 8, 1960   J. H. STONE   2,927,825
BEARING SUPPORT
Filed Dec. 3, 1956
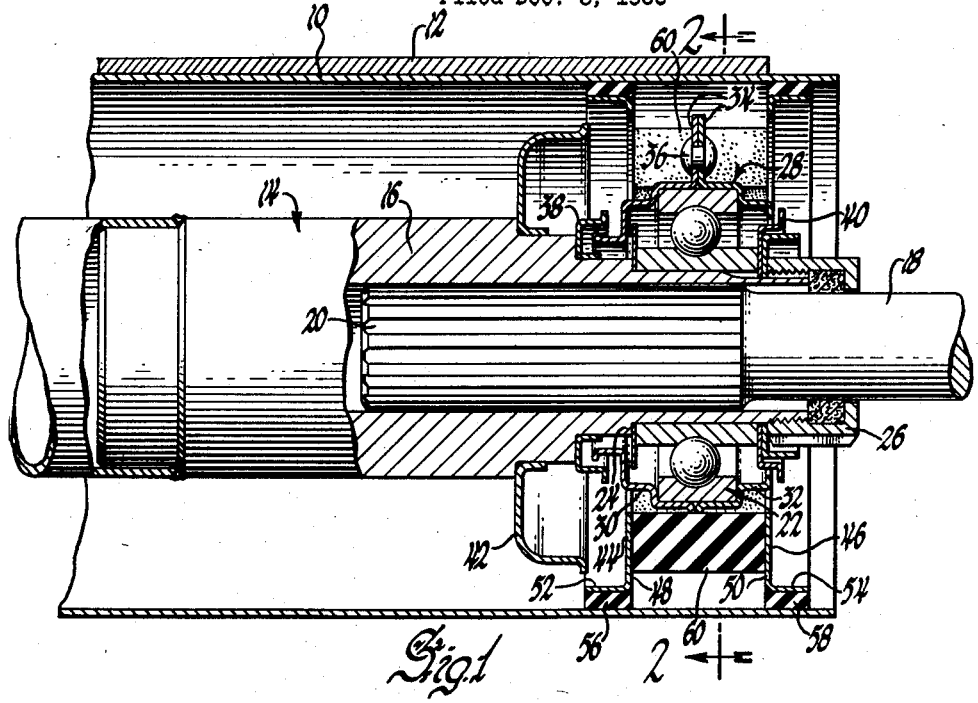
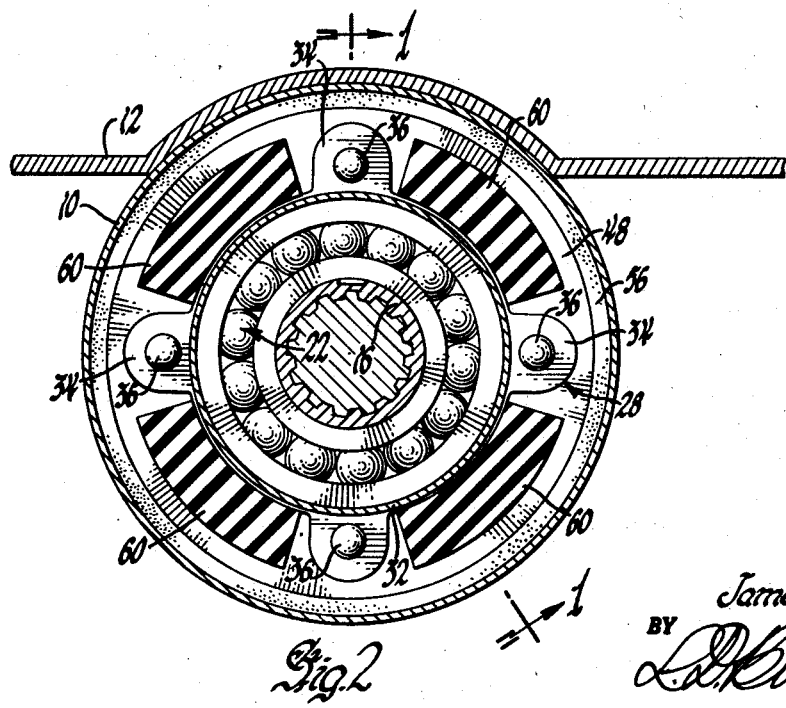
INVENTOR.
James H. Stone
BY
ATTORNEY

United States Patent Office 2,927,825
Patented Mar. 8, 1960

2,927,825

BEARING SUPPORT

James H. Stone, Birmingham, Mich., assignor to General Motors Corporation, Detroit, Mich., a corporation of Delaware Application December 3, 1956, Serial No. 625,819

5 Claims. (Cl. 308—184)

This invention relates to shaft supporting means and more particularly to a vehicle drive shaft center bearing support.

The use of multiple section vehicle drive shafts having universal joint connections therebetween, requires a shaft support where more than two universal joints are used. Such a support is usually disposed near one of the ends of one of the shaft sections and is such as permits free rotation of the shaft while restraining its tendency to gyrate. It is also advantageous that such shaft support include vibration damping means for minimizing or eliminating road noises and other drive disturbances received and transmitted through the drive shaft member.

It is here proposed to provide a support for a drive shaft center bearing including the preferred features aforementioned and which comprises a tubular member which may be secured to the underbody of the vehicle and receives the drive shaft therethrough. A plurality of resilient mounting blocks are provided within the tubular member, in spaced peripheral relation to the inner wall of the tube, for resiliently supporting a shaft receiving bearing member. The mounting blocks are disposed to receive disturbance forces in shear rather than compression and, consequently, are more effective to damp out undesirable vibrations which would otherwise be transmitted from the shaft through the bearing support and to the vehicle body.

In the drawings:

Figure 1 is a cross-sectioned side view of the proposed shaft support means taken in the plane of line 1—1 of Figure 2 and viewed in the direction of the arrows thereon.

Figure 2 is a cross-sectioned end view of the shaft supporting means of Figure 1 taken in the plane of line 2—2 and viewed in the direction of the arrows thereon.

A tubular member 10 is shown secured to a vehicle underbody 12 and having a vehicle drive shaft 14 concentrically disposed therein and extended therethrough. The drive shaft includes a forward drive section 16 and an after drive section 18 spline connected together as at 20. A ball bearing member 22 is received and supported upon the end of the forward drive section and is retained against a shouldered portion 24 thereof by lock nut means 26 threaded upon the end of the shaft section.

The ball bearing member 22 includes an outer retainer member 28 comprised of annular retainer rings 30 and 32 having circumferentially spaced flanged portions 34 secured together as by rivets 36. Generally conventional guard members and dirt inhibitors 38 and 40 are disposed about the bearing member to protect against dirt and other foreign substances. A slinger 42 is also provided on the drive shaft section 16 forwardly of the bearing member to protect the bearing against dirt and debris.

Spaced annular walls 44 and 46 are provided within the tubular member on opposite sides of the bearing by disc members 48 and 50 having flanged portions 52 and 54 spaced from the inner wall of the tubular member by resilient bands or rings 56 and 58 disposed therearound.

Arcuate shaped mounting blocks 60 are disposed between the disc members 48 and 50 and in spaced relation to the inner wall of the tubular member 10 with opposite sides secured to adjacently disposed walls 44 and 46 of the bearing supporting discs. The mounting blocks 60 are circumferentially spaced to receive the flanged ears 34 of the bearing retainer members therebetween and are disposed to receive and support the retainer member 28 with its bearing 22 concentrically within the shaft receiving tube. The mounting blocks are disposed to receive vibration and other disturbance forces in shear rather than in compression, as with the normal type of bearing supporting mount, and thus provides a much softer mount capable of more readily dissipating vibration and other disturbance forces normally transmitted from the drive shaft through the bearing support mounting to the vehicle body. The resilient bands or spacers separating the disc members from the tube further serve to prevent vibration and other forces from being transmitted through the support mounting.

I claim:

1. Drive shaft support means comprising parallel spaced annular discs resiliently mounted within a tubular member and having a shaft receiving bearing member disposed therebetween, and resilient mounting blocks secured to and extended between said discs for receiving and supporting said bearing member thereon and in spaced relation between said discs.

2. Drive shaft support means comprising parallel spaced annular discs resiliently mounted within a tubular member and having a shaft receiving bearing member disposed therebetween and in parallel spaced relation thereto, a plurality of separate resilient mounting blocks secured to and extended between adjacent faces of said discs, said blocks being circumferentially disposed to receive and support said bearing member concentrically therebetween.

3. Drive shaft support means comprising a tubular member having radially disposed and spaced annular walls provided therewithin, a shaft receiving bearing member disposed in concentric relation within said tubular member and between said walls, and a plurality of circumferentially spaced mounting blocks concentrically disposed about the outer periphery of said bearing member for receiving and supporting said bearing member within said tubular member and in spaced relation to the inner wall thereof.

4. Drive shaft support means comprising a tubular member for receiving a drive shaft therethrough, a pair of spaced annular members received within said tubular member and having inwardly disposed radial walls, circumferentially disposed mounting blocks secured to said walls and extended therebetween, said blocks being peripherally spaced from said tubular member, and a shaft receiving bearing member concentrically disposed within said tubular member and received and supported upon said mounting blocks.

5. Vehicle drive shaft support means comprising a tubular member adapted to be secured to a vehicle underbody and to have a vehicle drive shaft extended therethrough, axially spaced support members disposed within said tubular member and having resilient means spacing said support members apart from said tubular member, said support members including annular walls disposed in parallel spaced relation concentrically within said tubular member, a plurality of separate arcuate shaped resilient mounting blocks secured to and extended between adjacent side faces of said walls, said blocks being spaced apart from said tubular member and arranged to provide a bearing receiving access therebetween, and a shaft receiving ball bearing member received and supported within said tubular member upon said mounting blocks, said blocks being subjected to shear forces in resisting gyration of said shaft and bearing member.

References Cited in the file of this patent

UNITED STATES PATENTS

| | | |
|---|---|---|
| 2,371,206 | Zink et al. | Mar. 13, 1945 |
| 2,414,335 | Schroeder | Jan. 14, 1947 |
| 2,659,585 | McCallum | Nov. 17, 1953 |